June 17, 1930.    J. HARTMAN    1,765,267
SINK BUCKET
Filed May 8, 1926

Jacob Hartman
Inventor
by Smith & Furman
Attorneys

Patented June 17, 1930

1,765,267

UNITED STATES PATENT OFFICE

JACOB HARTMAN, OF CLEVELAND HEIGHTS, OHIO

SINK BUCKET

Application filed May 8, 1926. Serial No. 107,587.

This invention relates to sink buckets, by which I designate containers adapted to be employed in connection with kitchen sinks for the reception of garbage and offal. The objects of the invention are the provision of a simple and convenient device adapted to be attached to a sink spout and thereby supported out of the way yet in convenient position for use; the provision of a device having a cover so associated therewith that it is held against falling when displaced from the receptacle, without the need of finding some place to deposit the same; the provision of a device which can be readily removed from or restored to its bracket without danger of leaking on the floor; the provision of a device of this character which can be made without undue waste of metal; the provision of a device of this character having a peculiar form of bracket adapted for use in cramped positions as well as in larger space; while further objects and advantages of the invention will become apparent as the description proceeds. This application is a continuation in part of prior applications: Serial No. 407,951, filed Sept. 3, 1920; Serial No. 697,902, filed Mar. 8, 1924.

Figure 1:
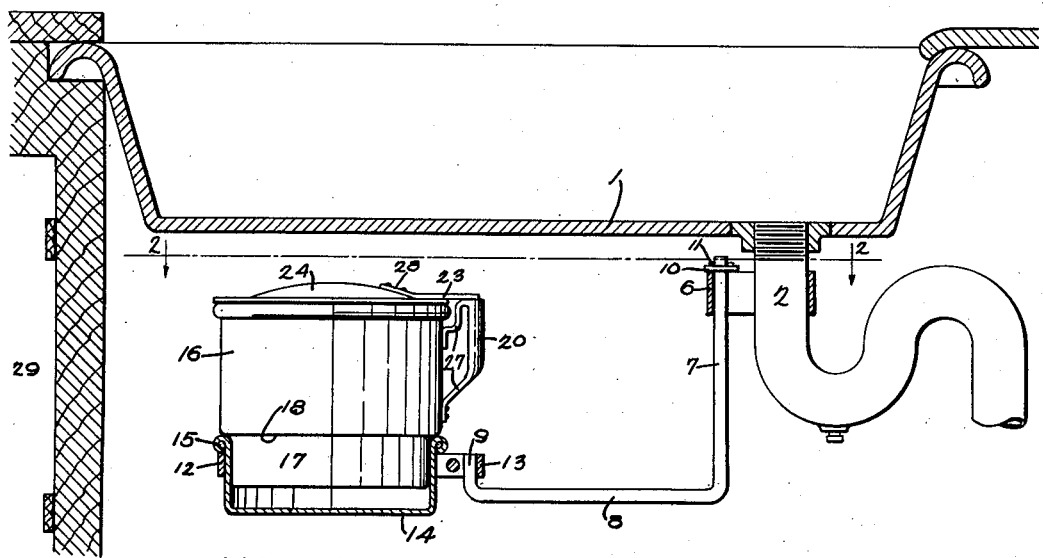
Figure 2:
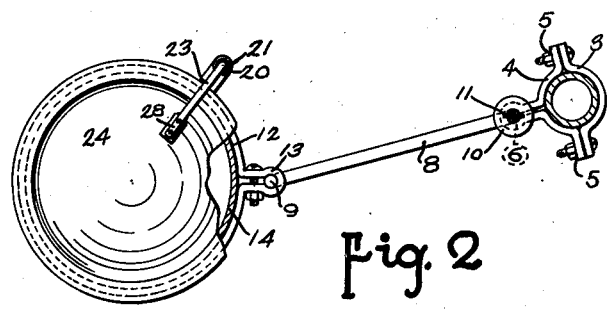
Figure 3:
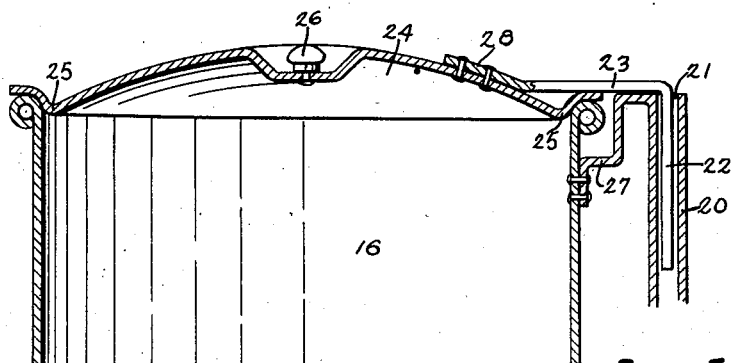

In the drawings Fig. 1 illustrates my improvements as applied to a small sized sink; Fig. 2 is a top plan view corresponding to the line 2—2 of Fig. 1, a part of the bucket being broken away; and Fig. 3 is a central vertical sectional view through the upper part of the bucket.

Most kitchen sinks comprise a flat-bottomed trough 1 having a vertical sink spout 2, and often having also at one end a cupboard 29 defining a small space beneath the bottom of the sink. In order to utilize this space for the purpose in view I secure to the sink spout 2 a clamp having two members 3 and 4 bolted together at 5, the member 4 having at one side the vertical socket 6 in which is secured the vertical limb 7 of a U-shaped bracket having a horizontal arm 8 and a second upturned limb 9 shorter than the first limb. In the present embodiment the bracket is held in place by a washer 10 and cotter pin 11.

Pivoted to the limb 9 is a circular hoop 12 formed at one side with a suitable socket 13, and received in this hoop is a metal dish 14 which terminates in the horizontal rim 15. The garbage bucket itself consists of an upright receptacle 16 having at its lower end a reduced extension 17 adapted to fit loosely in the open top of the dish 14 and having a downwardly facing shoulder 18 adapted to limit its entrance into said dish. This receptacle is provided at one side with a handle 20 formed with a vertical open top socket 21 therein, in which is loosely received a pintle 22 having a horizontal arm 23 fastened to the cover 24. This cover is preferably formed with a depending flange 25 near its margin adapted to fit loosely into the top of the receptacle 16 and also with a knob 26 wherein the cover can be manipulated. The handle 20 must conveniently be made of sheet metal, the body portion rolled to form a hollow cylinder and having ears 27 at its upper and lower ends which are riveted to the sides of the receptacle 16. In its simplest form the pintle 22 and arm 23 consist of a single piece of stiff rod bent to the desired angle, the end of the horizontal portion being fastened at 28 where it is riveted to the cover.

By reason of being pivoted at the point 13 as well as at the socket 6 this device is applicable to nearly every installation. Inasmuch as the pintle 22 fits loosely and easily into the socket 21 it is not difficult to apply or remove the cover. In adding to the contents of the pail it is necessary merely to brush the cover to one side where it will be held by the pintle without the necessity of finding a place to lay the same so as to devote both hands to the work in view. If desired the entire garbage bucket can be lifted out by the handle 20, and upon being returned it is not necessary to clean or wipe the bottom thereof to prevent dropping since the dish 14 will attend to this. All parts are readily dismantled for washing, and all manipulations can be performed with one hand only.

Having thus described my invention what I claim is:

1. In a sink bucket device, in combination, a clamp adapted for attachment to a sink spout and having at one side a vertical socket, a U-shaped rod having arms of unequal length, one of said arms supported pivotally in said socket, a circular receiving member having at one side a socket pivotally receiving the other arm of said U, and a garbage bucket removably supported by said member.

2. In a sink bucket device, in combination, a clamp adapted for attachment to a sink spout, a hoop, a dish carried by said hoop, a garbage bucket having a reduced lower end removably seated in said dish, and a bracket pivoted at its opposite ends to said clamp and hoop respectively.

In testimony whereof I hereunto affix my signature.

JACOB HARTMAN.